United States Patent
Senft et al.

(10) Patent No.: US 10,760,656 B2
(45) Date of Patent: Sep. 1, 2020

(54) TENSIONING ASSEMBLY FOR BELT-DRIVEN LINEAR MODULE AND LINEAR MODULE COMPRISING SAME

(71) Applicant: Bosch Rexroth (Changzhou) Co. Ltd., Wujin (CN)

(72) Inventors: Daniel Senft, Beyern (DE); Zhilei Ding, Jiangsu (CN)

(73) Assignees: Bosch Rexroth (Changzhou) Co. Ltd., Wujin (CN); Robert Bosch GmbH, Stuttgart (DE)

( * ) Notice: Subject to any disclaimer, the term of this patent is extended or adjusted under 35 U.S.C. 154(b) by 189 days.

(21) Appl. No.: 16/003,365

(22) Filed: Jun. 8, 2018

(65) Prior Publication Data

US 2018/0355957 A1    Dec. 13, 2018

(30) Foreign Application Priority Data

Jun. 8, 2017   (CN) .......................... 2017 1 0426391

(51) Int. Cl.
*F16H 7/14* (2006.01)
*F16H 19/06* (2006.01)
*F16H 7/08* (2006.01)

(52) U.S. Cl.
CPC .............. *F16H 7/14* (2013.01); *F16H 19/06* (2013.01); *F16H 19/0672* (2013.01); *F16H 2007/088* (2013.01); *F16H 2007/0842* (2013.01); *F16H 2007/0857* (2013.01); *F16H 2007/0872* (2013.01); *F16H 2007/0895* (2013.01); *F16H 2019/0686* (2013.01)

(58) Field of Classification Search
USPC ......................................................... 198/813
See application file for complete search history.

(56) References Cited

U.S. PATENT DOCUMENTS

| | | | | |
|---|---|---|---|---|
| 3,675,761 A * | 7/1972 | Hall | .......................... | A24C 5/35 198/689.1 |
| 3,857,301 A * | 12/1974 | Hanks | ....................... | F16D 1/12 475/332 |
| 4,549,449 A * | 10/1985 | Miller | ....................... | F16H 3/54 475/138 |
| 2008/0139353 A1 * | 6/2008 | Stepniak | ............... | F16H 7/1281 474/112 |
| 2009/0062046 A1 * | 3/2009 | Lindemann | ........... | F16H 7/1263 474/101 |
| 2013/0062167 A1 * | 3/2013 | Alotto | .................... | B65G 21/06 198/813 |
| 2013/0165284 A1 * | 6/2013 | Mennerat | .................. | F16H 7/12 474/112 |
| 2015/0141185 A1 * | 5/2015 | Albrecht | ................. | F16H 55/36 474/199 |

FOREIGN PATENT DOCUMENTS

JP    59083857 A *  5/1984  ........... F16H 7/1281

* cited by examiner

*Primary Examiner* — Prasad V Gokhale
(74) *Attorney, Agent, or Firm* — Maginot, Moore & Beck LLP

(57) ABSTRACT

A belt-driven linear module includes a tensioning assembly and a drive belt. The tensioning assembly includes a support shaft and a bearing. The support shaft is configured to be installed at a driven end of the linear module. The bearing includes an inner ring and an outer ring. The inner ring is positioned on the support shaft, and the outer ring is configured to be wrapped by the drive belt of the linear module so as to tension the drive belt of the linear module.

9 Claims, 3 Drawing Sheets

TENSIONING ASSEMBLY FOR BELT-DRIVEN LINEAR MODULE AND LINEAR MODULE COMPRISING SAME

This application claims priority under 35 U.S.C. § 119 to patent application number CN 201710426391.7 filed on Jun. 8, 2017 in China, the disclosure of which is incorporated herein by reference in its entirety.

The present disclosure relates to the technical field of machinery; in particular, the present disclosure relates to a tensioning assembly for a belt-driven linear module, and further relates to a belt-driven linear module comprising same.

BACKGROUND

A linear module is used for moving or conveying operations on an automated production line, and can realize precise positioning, helping to improve production quality and reduce production costs.

The demand for production lines in production and manufacturing processes at the present time is rising with each passing day, hence the demand for linear modules is also growing steadily. Belt-driven linear modules are one type of linear module commonly used in existing designs.

FIG. 1 is a schematic drawing of a longitudinal section of a belt-driven linear module in the prior art. As shown in the figure, the linear module comprises a driving belt wheel 1, a driven belt wheel 2 and a drive belt 3. The driving belt wheel 1 and driven belt wheel 2 are disposed on bearings 4 and 5 at two ends of the linear module respectively, and the drive belt 3 is wound on the driving belt wheel 1 and driven belt wheel 2 in a tensioned manner. The drive belt 3 is connected to a carriage 6, and the driving belt wheel 1 is driven in forward and reverse rotation by means of an electric machine (not shown), such that the carriage 6 reciprocates between the driving belt wheel 1 and the driven belt wheel 2 along a guide rail 7.

FIG. 2 is a schematic drawing of a cross section of a driven end of the linear module in FIG. 1. As shown in the figure, a support shaft 8 at the driven end is mounted to a main frame (housing) 9 of the linear module, with each bearing 5 being fixed to the support shaft 8 by means of two snap rings 10. The driven belt wheel 2 is fitted round outer rings of the bearings 5, and two ends of the driven belt wheel 2 are provided with flanges preventing the drive belt 3 from slipping off.

Generally, the bearings 5 in FIG. 2 are fixed to the support shaft 8 by means of snap rings 10, forming a tensioning assembly disposed at the driven end (i.e. tensioning end) of the linear module. In such a linear module, the drive belt can be tensioned at the driven end by moving the tensioning assembly.

SUMMARY

The object of one aspect of the present disclosure is to provide an improved tensioning assembly for a belt-driven linear module.

The object of another aspect of the present disclosure is to provide a belt-driven linear module comprising the tensioning assembly.

To achieve the abovementioned object, one aspect of the present disclosure provides a tensioning assembly for a belt-driven linear module, wherein the tensioning assembly comprises:

a support shaft, suitable for being installed at a driven end of the linear module; and a bearing, an inner ring of the bearing being disposed on the support shaft, and an outer ring of the bearing being suitable for being wrapped by a drive belt of the linear module, so as to tension the drive belt of the linear module.

Optionally, in the tensioning assembly described above, two snap rings are disposed on the support shaft, and the inner ring of the bearing is sandwiched between the two snap rings.

Optionally, in the tensioning assembly described above, the bearings are more than one in number, and are disposed adjacently side by side.

Optionally, in the tensioning assembly described above, the tensioning assembly comprises a U-shaped bearing block, two ends of the support shaft are mounted to two side plates of the bearing block respectively, and upper ends of the two side plates of the bearing block are higher than the outer ring of the bearing.

Optionally, in the tensioning assembly described above, a support shaft installation slot, open towards one end, is formed in each of the two side plates, and a limiting screw is provided on a sidewall of each of the support shaft installation slots, the limiting screws limiting the two ends of the support shaft respectively in the support shaft installation slots.

Optionally, in the tensioning assembly described above, an adjustment screw hole, open towards said one end, is formed in each of the two side plates.

Optionally, in the tensioning assembly described above, a locating edge is formed on the bottom of a bottom plate of the bearing block; the locating edge is suitable for being aligned with a reference edge on the bottom of a main frame of the linear module, and a locating hole is formed in the bottom plate of the bearing block.

Optionally, in the tensioning assembly described above, a locating protruding strip is formed on the bottom of the bottom plate of the bearing block, with one side of the locating protruding strip serving as the locating edge.

To achieve the abovementioned object, another aspect of the present disclosure provides a belt-driven linear module, wherein any one of the tensioning assemblies described in the first aspect above is disposed at a driven end of the linear module, and the drive belt of the linear module is wound on the outer ring of the bearing in a tensioned manner.

To achieve the abovementioned object, another aspect of the present disclosure provides a belt-driven linear module, comprising a driven end, wherein the linear module comprises a support shaft installed at the driven end by means of a U-shaped bearing block, a bearing is disposed on the support shaft, and two ends of the support shaft are mounted to two side plates of the bearing block respectively, wherein a drive belt of the linear module is wound on an outer ring of the bearing in a tensioned manner, and a support shaft installation slot, open at one end, is formed in each of the two side plates of the bearing block, the bearing block being set such that an opening of the support shaft installation slot faces an extremity of the driven end.

Optionally, in the linear module described above, an adjustment screw hole is formed on said one end of each of the two side plates, an end plate at the extremity of the driven end is connected to the adjustment screw hole by means of an adjustment bolt, and an adjustment distance is reserved between the end plate and the bearing block.

Optionally, in the linear module described above, a locating edge is formed on the bottom of a bottom plate of the bearing block, a reference edge is formed on the bottom of a main frame of the linear module, the locating edge and the reference edge both extend in the longitudinal direction of the linear module, and the bearing block is located in the main frame through alignment of the locating edge with the reference edge.

Optionally, in the linear module described above, a locating protruding strip is formed on the bottom of the bottom plate of the bearing block, with one side of the locating protruding strip serving as the locating edge; a reference protruding strip is formed on the bottom of the main frame of the linear module, with one side of the reference protruding strip serving as the reference edge.

Optionally, in the linear module described above, a through-hole is formed in the bottom plate of the bearing block, a T-shaped groove is formed in the main frame, and the bearing block is fixed to the T-shaped groove by a bolt passing through the through-hole.

BRIEF DESCRIPTION OF THE DRAWINGS

The disclosed content of the present disclosure will be more obvious if reference is made to the accompanying drawings. It will be understood that these drawings serve a purely explanatory purpose, and are not intended to constitute a limitation on the scope of protection of the present disclosure. In the drawings.

DETAILED DESCRIPTION

Figure 1:
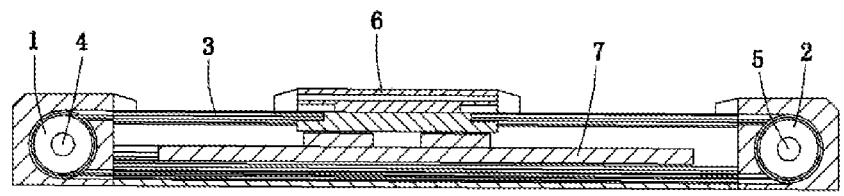
FIG. 1 is a schematic drawing of a longitudinal section of a linear module in the prior art.

Particular embodiments of the present disclosure are explained in detail below with reference to the accompanying drawings. In the drawings, identical drawing labels represent identical or corresponding technical features. Each drawing is merely intended to explain and illustrate, and has not been drawn to scale.

Figure 3:
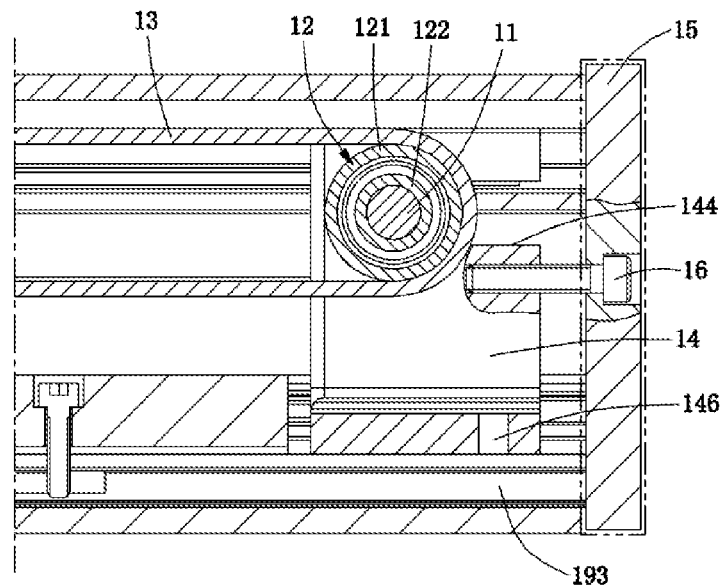
FIG. 3 is a partial schematic drawing of a longitudinal section of a driven end of a linear module according to an embodiment of the present disclosure.

FIG. 3 is a partial schematic drawing of a longitudinal section of a driven end of a linear module according to an embodiment of the present disclosure. Based on the teaching of the present application, a person skilled in the art could obtain the linear module of this embodiment by using this driven end to replace a driven end of a linear module in the prior art.

It will be understood that the driven end can have a guiding and tensioning action on a drive belt in the linear module. On the one hand, the movement direction of the carriage is controlled by means of the drive belt; on the other hand, the tensioning of the drive belt is controlled, so that the linear module operates effectively.

As shown in FIG. 3, a support shaft 11 is installed at the driven end of the linear module, and a bearing 12 is disposed on the support shaft 11. In the driven end, a drive belt 13 of the linear module is wound on an outer ring 121 of the bearing 12 in a tensioned manner; an inner ring 122 of the bearing 12 is fixed to the support shaft 11.

According to this embodiment, no additional driven belt wheel is disposed on the bearing outer ring 121 of the bearing 12; the drive belt 13 is wound directly on the bearing outer ring 121 of the bearing, using the bearing outer ring 121 as a driven belt wheel (guiding belt wheel). This design omits an additional driven belt wheel, significantly reducing costs, and at the same time makes the structure more compact, correspondingly eliminating the step of driven belt wheel assembly, saving assembly time and facilitating assembly.

The support shaft 11 itself may be fixed (such that the support shaft 11 itself cannot rotate) in the driven end, or may be rotatably installed in the driven end; for example, it may be installed in the driven end by methods including but not limited to bolt fixing, engagement connection and nesting. In an optional embodiment of the present disclosure, the installation position of the support shaft 11 can be adjusted in the longitudinal direction of the linear module to adjust the tension of the drive belt.

Figure 2:
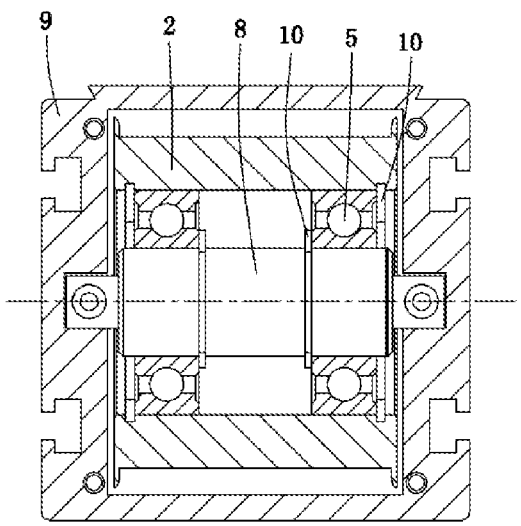
FIG. 2 is a schematic drawing of a cross section of a driven end of the linear module in FIG. 1, showing a tensioning assembly in the prior art.

In an optional embodiment of the present disclosure, the support shaft 11 can be mounted directly to a main frame of the linear module at the driven end of the linear module, as shown in FIG. 2.

Figure 4:
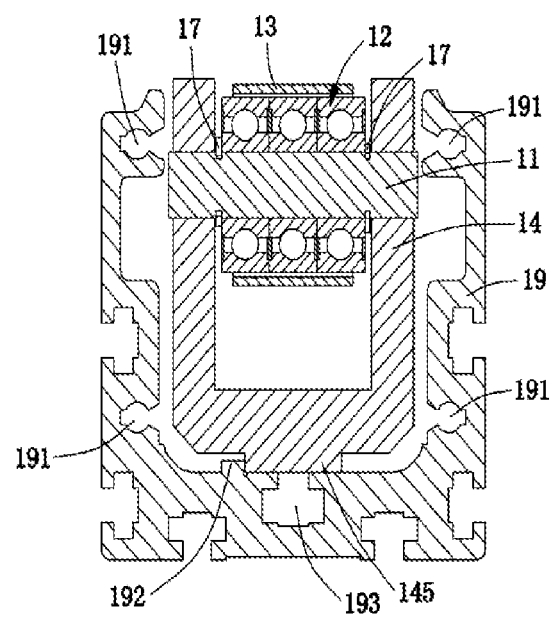
FIG. 4 is a schematic drawing of a cross section of the driven end of the linear module in FIG. 3.

In the embodiment shown in FIG. 3, the support shaft 11 is first fitted to a bearing block 14; the bearing block 14 is then mounted to a main frame 19 of the linear module (see FIG. 4). This is described in further detail below with reference to FIGS. 4 and 5.

It can be seen from FIG. 3 that in this embodiment, an adjustment screw hole 141, open towards an extremity of the driven end of the linear module, may be formed on the bearing block 14; the adjustment screw hole is connected to an end plate 15 by means of an adjustment bolt 16. The adjustment bolt 16 passes through a through-hole of the end plate 15, but is not connected thereto by screw-thread. The end plate 15 may be mounted to the extremity of the driven end of the linear module by a method such as, but not limited to, bolt connection. As shown in the figure, an adjustment distance is reserved between the end plate 15 and the bearing block 14; it will be understood that the bearing block 14 may be pulled by turning the adjustment bolt 16, so as to adjust the position of the bearing block 14 relative to the end plate 15, to realize adjustment of the tension of the drive belt 13.

In an optional embodiment, various types of drive belt 13 may be used, such as but not limited to a flat belt, toothed belt, wedge belt, V-belt, round belt or mesh belt. It must be pointed out that the use of different types of drive belt in combination in an optional embodiment is not ruled out here. In the case where these different types of drive belt are used, components adjoining the drive belt may be designed correspondingly according to the specific features of the different types of drive belt, based on the teaching of the present application.

In an optional embodiment, the types of bearing 12 which may be used include but are not limited to various rolling bearings, e.g. ball bearings and roller bearings. Such a bearing 12 may have a bearing outer ring 121, a bearing inner ring 122 and balls or rollers distributed between the bearing outer ring 121 and the bearing inner ring 122. As stated above, the drive belt 13 of the linear module is wound on the bearing outer ring 121, and the bearing inner ring 122 is fitted to the support shaft 11.

FIG. 4 is a schematic drawing of a cross section of the driven end of the linear module in FIG. 3. As shown in the figure, in this embodiment, the bearing block 14 is installed in the main frame 19 of the linear module. Three bearings 12 are installed side by side in the bearing block 14 by means of the support shaft 11, the three bearings 12 being limited on the support shaft 11 by means of two snap rings 17. The drive belt 13 is wound directly on the outer rings of the bearings 12.

The bearing block 14 may be made of aluminum or an aluminum alloy material; this can reduce the weight of the product as far as possible, while meeting rigidity demands. It will be understood that the possibility of using other materials in other embodiments is not ruled out here. In an optional embodiment, the bearing block 14 may be manufactured by a process such as, but not limited to, extrusion or machining.

Figure 5:
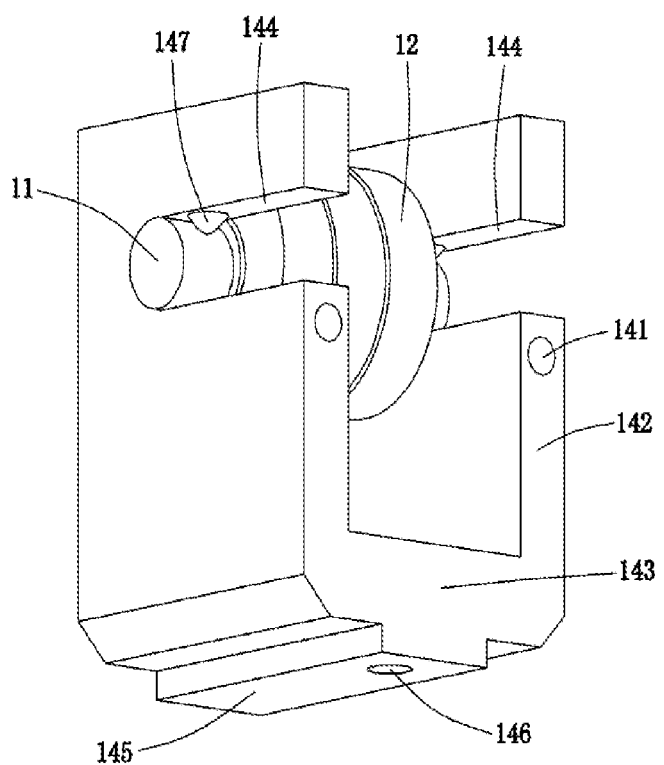
FIG. 5 is a three-dimensional schematic drawing of installation of the bearing in FIG. 3.

FIG. 5 is a three-dimensional schematic drawing of installation of the bearing in FIG. 3. FIG. 5 shows in a visually direct manner the structure of the bearing block 14 in this embodiment, as well as the manner in which the support shaft 11 with the bearing 12 is installed therein.

Some particular embodiments of the present disclosure are described in more detail below, with reference to the example in FIGS. 3 to 5.

It will be understood that although three bearings 13 are disposed side by side on the support shaft 11 in the example in the figures, in an optional embodiment it would also be possible to dispose just one bearing, or another number of bearings greater than one; there is no restriction to the number shown in the figures. When the number of bearings is greater than one, these bearings 11 may be disposed so as to adjoin each other; it is also possible for a small gap to be provided between adjacent bearings, without affecting the operational performance of the linear module.

In an optional embodiment, a suitable fastening element may be used to locate the bearing inner ring 122 of the bearing 12 on the support shaft 11, thereby locating the bearing 12 on the support shaft. The embodiment shown in the figures uses snap rings 17, which are easy to use, and can snap into a shaft groove on the support shaft 11 directly, to limit axial movement of the bearing on the support shaft 11. In an optional embodiment, the specific form of the snap ring 17 may be an E-shaped snap ring, a C-shaped snap ring or a U-shaped snap ring, etc.

Here, "fastening element" is intended to include all suitable fastening elements such as but not limited to snap rings, e.g. a fastening sleeve or a bolt; shaft shoulder locating could also be employed at one end of the bearing, and the inner ring of the bearing could also be fitted to the support shaft by an interference fit.

A total of two snap rings 17 are disposed on the support shaft 11 in the figures, being located at a left end and a right end respectively of the adjacent bearings arranged side by side, and clamping the bearing inner rings therebetween. This can reduce the number of steps involved in mounting the bearings 12 to the support shaft 11 relative to the prior art, because the number of snap rings is reduced. In another optional embodiment, it would also be possible to arrange fastening elements such as snap rings at two ends of each bearing.

In the embodiment shown in the figures, the bearing block 14 is a U-shaped structure, which is a simple design, and easy to manufacture. In this embodiment, the bearing block 14 may comprise two side plates 142 and one bottom plate 143; the support shaft 11 is disposed in support shaft installation slots 144, which are open towards one end, of the two side plates 142; the bearing block 14 itself is located and fixed in the main frame 19 by means of the bottom plate 143. FIG. 5 shows in a visually direct manner the support shaft installation slots 144 in the side plates 142 of the bearing block 14, as well as a locating protruding strip 145 and a locating hole 146 on the bottom plate 143. FIG. 5 also shows a limiting screw 147 on a sidewall in the support shaft installation slot 144, and the adjustment screw hole 141 formed on an end face of the side plate 142 where the opening of the support shaft installation slot 144 is located.

To assemble, first of all the bearings 12 may be fitted onto the support shaft 11, and axially fixed using snap rings 17 (or other suitable fastening elements), to form a sub-assembly; this sub-assembly can then be fitted into the support shaft installation slots 144 in the two side plates 142 of the bearing block 14.

A protruding limiting screw 147 is disposed in each support shaft installation slot 144, serving the function of limiting the sub-assembly therein, to prevent the sub-assembly from loosening or even falling off. In the example shown in the figures, the limiting screw 147 is specifically arranged at an upper sidewall of the support shaft installation slot 144. In an optional embodiment, the arrangement position of the limiting screw 147 may be adjusted according to specific needs, e.g. may be arranged at a lower sidewall of the support shaft installation slot 144.

It will be understood here that one aspect of the present disclosure also provides a tensioning assembly for a belt-driven linear module; the tensioning assembly may only comprise the sub-assembly formed by the support shaft 11 and the bearing 12 described in this context, or may also comprise the bearing block 14 described in this context. In different embodiments, the support shaft, bearing and bearing block may have corresponding modifications and variations. The tensioning assembly is suitable for being installed at the driven end of the belt-driven linear module, to provide guidance and tensioning for the drive belt.

In an optional embodiment, the two side plates 142 of the bearing block 14 may also be used to prevent the drive belt 13 from slipping off the bearing 12; this could for example be realized by designing upper ends of the two side plates 142 to be higher than the outer ring of the bearing. In a further optional embodiment, the side plates 142 may be designed to be higher than the drive belt 13 wound on the outer ring of the bearing. Compared with the flanges at the two ends of the driven belt wheel in the prior art, such an embodiment is easier to realize, and has more reliable performance.

The installation direction of the bearing block 14 in the linear module can be seen in FIG. 3. Specifically, the opening of the support shaft installation slot 144 is facing the extremity of the driven end of the linear module, in the opposite direction to the tensioning pulling force of the drive belt 13.

According to FIG. 3, the end plate 15 is disposed at the extremity of the driven end of the linear module, being connected to the adjustment screw hole 141 by means of the adjustment bolt 16, with an adjustment distance being reserved between the end plate 15 and the bearing block 14. It will be understood that the adjustment bolt 16 passes through a slot or the through-hole in the end plate 15 without any screw-thread connection, and the adjustment bolt 16 is connected by screw-thread to the interior of the adjustment screw hole 141 of the bearing block 14. Since the position of the end plate 15 is fixed, the bearing block 14 may be pulled relative to the end plate 15 by turning the adjustment bolt 16, thereby adjusting the tension of the drive belt 13.

FIG. 4 shows four screw holes 191 on the main frame 19 of the linear module; the end plate 15 may be fixed at these screw holes 191 by means of four bolts. In an optional embodiment, the end plate 15 could also be fixed to the main frame 19 by means of a different number of screw hole-bolt connections or another fixing element.

As shown in FIGS. 4 and 5, the locating protruding strip 145 and optional locating hole 146 are formed at the bottom of the bottom plate 143 of the bearing block 14; the locating protruding strip 145 extends in the longitudinal direction of the linear module. As shown in FIG. 4, a reference protruding strip 192 and an optional T-shaped groove 193 are formed on the bottom of the main frame 19 of the linear module.

When the bearing block 14 is installed in the main frame 19, one side of the locating protruding strip 145 is used as a locating edge and aligned with one side of the reference protruding strip 192 to locate the two relative to each other; this side of the reference protruding strip 192 serves as a reference edge.

It will be understood that in order to locate the bearing block 14 in the main frame 19, the specific shapes of the locating protruding strip 145 and the reference protruding strip 192 in the embodiment shown in the figures are not specifically defined. In an optional embodiment, as long as a locating edge is formed on the bottom of the bottom plate of the bearing block, and a reference edge is formed in the main frame of the linear module, with the locating edge and the reference edge both extending in the longitudinal direction of the linear module, then the bearing block can be located in the main frame through alignment of the locating edge with the reference edge.

The design of providing the locating edge and reference edge makes the alignment and locating of the bearing block 14 in the main frame 19 very convenient, not only saving assembly time and increasing production efficiency, but also making it possible for an operator with fewer skills to complete the assembly work in a manner which fulfils quality and quantity requirements, so labor costs can be reduced. At the same time, there is more flexibility in choosing the site for assembly, delivery times are faster, and assembly at multiple locations close to customers throughout the world is made possible.

The fixing of the bearing block 14 relative to the main frame 19 may be realized by bolt connection. Specifically, a bolt (not shown) may be inserted from an upper side of the bottom plate 143 of the bearing block 14 into the locating hole 146 thereof, and an extremity of the bolt may extend into the T-shaped groove 193 of the main frame 19. A nut (not shown), or a guide bar having a screw hole (not shown), may be disposed in the T-shaped groove 193, with the bolt being engaged with the nut or guide bar. It will be understood that after suitably loosening the screw-thread connection here, the bearing block 14 can be adjusted in the longitudinal direction of the linear module, and correspondingly, the nut or guide bar can slide in the T-shaped groove.

In order to aid understanding, FIG. 3 also shows the T-shaped groove 193 in the main frame 19 and the locating hole 146 formed in the bottom plate 143 of the bearing block 14. In an optional embodiment in which the T-shaped groove 193 and locating hole 146 are not provided, longitudinal fixing of the bearing block can be realized by the adjustment bolt itself.

A demonstrative description has been given herein with reference to the various views of the driven end of the linear module in FIGS. 3-5. Based on the teaching of the present application, a person skilled in the art could, by using the driven end of the linear module in the embodiments described herein to replace the driven end of a linear module in the prior art, obtain the linear modules in the corresponding embodiments. The linear modules thus obtained will have the corresponding technical advantages described with reference to various features herein, improving upon the linear module in the prior art.

It will be understood that the replaceable driven end of the linear module in the prior art that is mentioned here does not merely refer to the specific form of linear module shown in FIGS. 1-2, but may include any other suitable type of belt-driven linear module in which the driven belt wheel can be adjusted at the driven end of the linear module so as to adjust the drive belt tension.

The technical scope of the present disclosure is not limited to the content in the description above. A person skilled in the art could combine, modify and/or amend the embodiments above in various ways, on condition that the technical thinking of the present disclosure is not departed from; all such combinations, modifications and/or amendments shall be included in the scope of the present disclosure.

What is claimed is:

1. A tensioning assembly for a belt-driven linear module, comprising:
    a support shaft configured so as to be installable at a driven end of a belt-driven linear module;
    a bearing, including:
        an inner ring positioned on the support shaft; and
        an outer ring configured to be wrapped by a drive belt of the belt-driven linear module, so as to tension the drive belt and
    a U-shaped bearing block including two side plates having upper ends, wherein:
        two ends of the support shaft are mounted to the two side plates, respectively; and
        the upper ends of the two side plates are higher than the outer ring of the bearing.

2. The tensioning assembly of claim 1, further comprising:
    two snap rings positioned on the support shaft, wherein the inner ring of the bearing is sandwiched between the two snap rings.

3. The tensioning assembly of claim 1, further comprising:
    at least one further bearing positioned side by side with the bearing.

4. The tensioning assembly of claim 1, wherein each of the two side plates further has:
    a respective support shaft installation slot that is open at one end; and
    a limiting screw positioned on a sidewall of the respective support shaft installation slot, and configured to limit the two ends of the support shaft, respectively, in the respective support shaft installation slot.

5. The tensioning assembly of claim 4, wherein each of the two side plates further has a respective adjustment screw hole opening to a side of the U-shaped bearing block, wherein each of the respective support shaft installation slots opens to the side of the U-shaped bearing block.

6. The tensioning assembly of claim 1, wherein the bearing block further includes a bottom plate having:
    a bottom with a locating edge configured to align with a reference edge on a bottom of a main frame of the belt-driven linear module; and
    a locating hole in the bottom plate.

7. The tensioning assembly of claim 6, wherein:
    the bottom plate further has a locating protruding strip positioned on the bottom of the bottom plate; and a side of the locating protruding strip forms the locating edge.

8. A belt-drive linear module, comprising:
a driven end including an extremity;
a drive belt; and
a tensioning assembly, including:
  a U-shaped bearing block including two side plates, wherein each of the two side plates includes a respective support shaft installation slot that is open in a direction facing toward the extremity of the driven end;
  a support shaft installable in the U-shaped bearing block at the driven end; and
  a bearing, having:
    an inner ring positioned on the support shaft; and
    an outer ring, wherein the drive belt is wound on the outer ring in a tensioned manner.

9. A belt-driven linear module, comprising:
a driven end including an extremity;
a U-shaped bearing block including two side plates, wherein each of the two side plates includes a respective support shaft installation slot that is open in a direction facing toward the extremity of the driven end;
a support shaft having two ends, wherein the support shaft is installed at the driven end via mounting the two ends to the two side plates of the bearing block, respectively;
a bearing positioned on the support shaft, and including an outer ring; and
a drive belt wound on the outer ring of the bearing in a tensioned manner.

* * * * *